April 4, 1967

D. GABOR 3,312,840

THERMIONIC GENERATORS EMBODYING MAIN AND AUXILIARY
DISCHARGE CHAMBERS, CLOSELY SPACED EMITTER AND
COLLECTOR STRUCTURES, AND MEANS FOR
NEUTRALIZING SELF-MAGNETIC FIELDS

Filed Dec. 2, 1964

INVENTOR
DENNIS GABOR

BY
Cameron, Kerkam & Sutton
ATTORNEYS

INVENTOR
DENNIS GABOR
BY
Cameron, Kerkam & Sutton
ATTORNEYS

INVENTOR
DENNIS GABOR

April 4, 1967　　　　D. GABOR　　　3,312,840
THERMIONIC GENERATORS EMBODYING MAIN AND AUXILIARY
DISCHARGE CHAMBERS, CLOSELY SPACED EMITTER AND
COLLECTOR STRUCTURES, AND MEANS FOR
NEUTRALIZING SELF-MAGNETIC FIELDS

INVENTOR
DENNIS GABOR

April 4, 1967 D. GABOR 3,312,840
THERMIONIC GENERATORS EMBODYING MAIN AND AUXILIARY
DISCHARGE CHAMBERS, CLOSELY SPACED EMITTER AND
COLLECTOR STRUCTURES, AND MEANS FOR
NEUTRALIZING SELF-MAGNETIC FIELDS
Filed Dec. 2, 1964 6 Sheets-Sheet 5

FIG. 10

INVENTOR
DENNIS GABOR
BY
Cameron, Kerkam & Sutton
ATTORNEYS

April 4, 1967

D. GABOR 3,312,840

THERMIONIC GENERATORS EMBODYING MAIN AND AUXILIARY
DISCHARGE CHAMBERS, CLOSELY SPACED EMITTER AND
COLLECTOR STRUCTURES, AND MEANS FOR
NEUTRALIZING SELF-MAGNETIC FIELDS

Filed Dec. 2, 1964

INVENTOR
DENNIS GABOR
BY
Cameron, Kerkam + Sutton
ATTORNEYS

United States Patent Office 3,312,840
Patented Apr. 4, 1967

3,312,840
THERMIONIC GENERATORS EMBODYING MAIN AND AUXILIARY DISCHARGE CHAMBERS, CLOSELY SPACED EMITTER AND COLLECTOR STRUCTURES, AND MEANS FOR NEUTRALIZING SELF-MAGNETIC FIELDS

Dennis Gabor, London, England, assignor to National Research Development Corporation, London, England, a corporation of Great Britain
Filed Dec. 2, 1964, Ser. No. 415,238
Claims priority, application Great Britain, Dec. 23, 1959, 43,662/59; Mar. 24, 1960, 10,540/60
16 Claims. (Cl. 310—4)

This is a continuation-in-part of application Ser. No. 87,732, filed Dec. 14, 1960, now abandoned.

This invention relates to generators of electricity of the plasma or gas-discharged type in which current is generated from electrons issuing from a hot electron emitter and traversing a discharge space to a cold collector, commonly called thermionic generators, as distinguished from thermoelectric generators utilising solid-state thermoelements.

The object of the present invention is to improve the efficiency of such generators in various ways, and to increase their capacity and power density. Improved ways of producing ions for compensating the electron space charge have been found, and one aspect of the invention comprises a thermionic discharge generator wherein ions for compensating the electron space charge are produced by electron impact on the gas filling in an auxiliary discharge space. Ions are introduced into the main discharge space between the emitter and the collector through foraminations in the collector.

Improved ways of obtaining high power output from such generators have been found, another aspect of the invention comprising a plurality of paralleled generators having a common heat supply and a common cooling system. Preferably such generators will share a common vacuum envelope.

A further aspect of the invention comprises a thermionic electron discharge generator comprising a number of individual emitter-collector units, a common discharge space, and a number of discrete emitter plates on the emitter structure each with its own output lead through the discharge chamber to a common output terminal so as to prevent a concentration of self-magnetic fields in any section of the equipment.

Ways have also been found to neutralise the self-magnetic fields which form parallel to the emitter surface of a thermionic discharge generator and which tend to prevent electron emission. A further aspect of the invention comprises a thermionic electron discharge generator comprising means for generating a magnetic field with a substantial component normal to the emitter surface.

It is possible by the present invention to provide neutralising magnetic fields in, as well as to distribute or subdivide the output of, multiple generator equipment.

Another aspect of the invention comprises an electrical circuit for converting direct current to alternating current comprising two thermionic electron discharge generators in push-pull.

The invention will be clearly understood from the following description of certain embodiments shown in the accompanying drawings in which:

FIG. 12 illustrates the voltage-current characteristic of the auxiliary discharge, while

It is known that the voltage drop in a gas discharge with a hot cathode is essentially determined by the requirement of producing enough ions to neutralise the space discharge throughout the discharge space. The lowest voltage drops have so far been achieved in caesium arcs and were of the order of one volt for low currents, rising above two volts for higher currents.

In the embodiments of the invention to be described, ions are produced by electron impact on the gas filling; in the devices shown in the drawings, the ions are produced in an auxiliary discharge chamber behind the collector. The collector is foraminated, that is to say, pierced with an array of fine holes over part or all of its area. The electron discharge from the emitter to the collector results in the passage of jets of electrons through the collector holes into the auxiliary chamber in which the electrons ionise the gas therein by impact. The ions pass out through the collector holes into the main chamber and neutralise the space charge. The auxiliary discharge can be operated with direct current, with alternating current, or with high frequency current. In this arrangement, the voltage drop in the gas space is reduced to very small values.

The auxiliary discharge requires for its operation a voltage somewhat below the ionisation voltage of the gas filling. Pure argon requires 10–12 volts, argon-mercury mixture 7–10 volts, caesium about 3 volts. A little more is required for striking the discharge. In order to activate the auxiliary discharges, a small accumulator battery may be supplied, although the output of the generator may be used for maintaining the discharge. If the battery voltage is of the same order as the maintaining voltage, the striking peak can be provided by interrupting the current in a choke in known manner. The battery may be continuously recharged by the appropriate number of generators in series. With the right gases, at suitable pressures, the auxiliary discharge has a slightly positive characteristic is so stable that the discharge can be operated without a series resistance, although a small series resistor may be provided for safety.

Such thermionic devices can be operated with a filling of inert gases, particularly the heavy gases, such as argon, krypton, or xenon; or with metal vapours such as mercury, or zinc; or with vapours of the alkali metals.

Argon, krypton, and xenon produce stable auxiliary discharges in the openings of the foraminated collector, such as a gauze, which connects the main discharge space with the auxiliary discharge space, and have the advantage that they oppose very little resistance to the motion of slow electrons. Mercury, cadmium, and zinc give less stable auxiliary discharges, owing to the fact that at higher current densities there is a tendency to change over from a process of direct ionisation to a two-stage process, via the metastables, which has the unstabling effect of a falling or a negative characteristic. Very satisfactory stable operation has been obtained, however, with mixtures of argon and mercury with a prevalence of argon, for instance with argon at a pressure of 1 to 2 mm. of mercury mixed with mercury vapour at a pressure of a few micrometers of mercury.

The alkali metal vapours, such as lithium, sodium, potassium, rubidium, and caesium, also give rise to stable discharge characteristics, as the alkali atoms possess no metastable states, but their high chemical activity renders their use undesirable, at the high temperatures necessary. It is an important advantage to be able to effect efficient thermionic conversion with chemically inactive materials such as argon or mercury.

Figure 1:
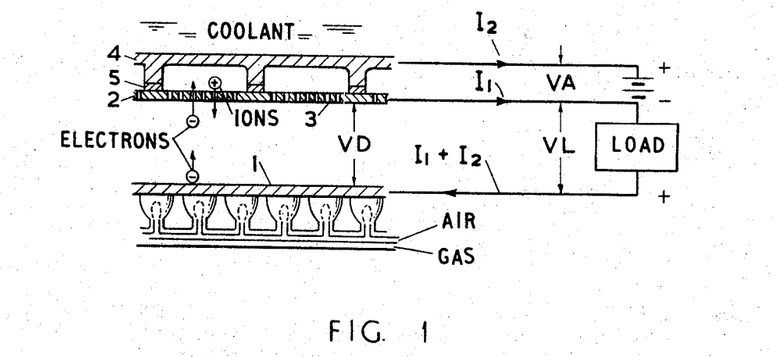
FIG. 1 is a schematic representation of a multiple thermionic generator with its accompanying circuit.

In FIG. 1, a cathode 1 is heated by a heat source, such as a gas burner, to a temperature of an order which is appropriate to electron emission.

The main discharge is between the cathode 1 and a collecting electrode 2, which is perforated or foraminated by an array of holes 3 of an appropriate size and number.

The auxiliary discharge is in an auxiliary discharge chamber which lies between the collector 2 and an auxiliary electrode 4, cooled for example by air, water, or oil.

To cool the collector 2, the electrode 4 is fitted with projections which are electrically insulated from collector 2 by thin layers 5 of electrical insulating material having good heat conducting properties.

Electrons are emitted by the cathode 1 and, driven by the small voltage drop $V_D$, for the most part land on the collector 2.

A small fraction of the emitted electrons penetrates through the holes 3 into the auxiliary discharge space, where they are accelerated by the larger voltage $V_A$ towards the anode 4. Some of these electrons have ionizing collisions with the gas or vapour atoms or molecules in this space, and a fraction of the resulting ions penetrates through the holes into the main discharge space. Under proper operating condition the electron stream through the holes has the form of small jets, and the electron space charge guides the ions, so that the percentage of the ions which find their way through the holes 3 is considerable, and can be of the order of 50%. This is achieved if the electron mean free path is neither larger nor much smaller than the depth of the auxiliary discharge space. It may be noted that at small current densities the gas density in the auxiliary discharge space is 3–5 times larger than in the main discharge space, because the absolute temperature of the gas in the auxiliary discharge space is lower. At large current densities the gas density in the auxiliary discharge space tends to drop, because the discharge acts as an ion pump.

For economic operation the auxiliary discharge must supply the required number of ions at as small a power in the said discharge as possible. For cathodes which are pure thermal emitters, such as all pure metals, it is known that the optimum ion current at the cathode is in the ratio $(m/M)^{1/2}$ to the electron current, where $m$ is the mass of the electron, and M the mass of the ion. For caesium this ratio is 1/494, for mercury 1/607. In composite cathodes, such as the oxides of barium, calcium or thorium, the optimum ion current may be higher, because an excess ion supply produces an electric gradient at the cathode surface, which assists in extracting electrons. Taking mercury as an example, it is sufficient to admit, say, 1/50 of the electrons into the auxiliary discharge space, so that the ratio of the currents $I_1$ and $I_2$ to the electrodes 2 and 4 as illustrated in FIG. 1 is about 1:50. A voltage drop $V_A$ of 15 volts is sufficient to produce the required number of ions, e.g. one for 6 electrons, i.e. one ion for 300 primary electrons. This allows for a 50% wastage of ions which hit the collector electrode. Most of these hit the collector after being returned in the main discharge space by collision with molecules, and fulfil a useful function by compensating the space charge near the collector. Thus, in this example $15/50 = 0.3$ watt/amp. is the power expended in the auxiliary discharge.

This power can be further reduced using only a small D.C. voltage drop in the auxiliary discharge, and superposing thereon a very high frequency oscillation. This operation is more economical, as the progress of the electron towards the auxiliary anode 4 is slowed down, while it performs several cycles of oscillations on its way to anode 4. The effect is as if the mean free path were reduced, and at equal current $I_2$ a larger fraction of the electrons will produce ion pairs before reaching the auxiliary anode.

Experience shows that the operation as described, with electron jets issuing from the holes 3, has a positive characteristic, which means that a great number of holes can operate in parallel without instability, even if there is no resistance between the auxiliary voltage source and the electrode 4. Care must be taken however to avoid arcing through the holes. This is avoided by making the holes sufficiently small and numerous. In inert gases the hole diameter can be as large as 0.25 mm.; in mercury and alkali vapours preferably only half as large or less. Experience shows that the ratio of the currents, $I_2/I_1$, is smaller in proper operation than the ratio of the clear or open areas to the metallic area of the collector 2; for instance, the currents ratio may be 1:50 when the ratio of areas is 1:10. As an example, with holes of 0.115 mm. diameter, i.e. with 0.01 mm.$^2$ clear area, this means that there must be one hole per 0.1 mm.$^2$, in a square of 0.31×0.31 mm., i.e. there will be 1000 holes per cm.$^2$. Such a collector can be realised for instance by photo-etching, or by electro-plating a wire gauge having 80 wires/inch, until the hole diameters are reduced to 0.115 mm. or about 0.005". Gauze of 120 wires per inch is very suitable without modification. Finally, the foraminated collecting electrode thus produced is coated, at least on its surface exposed to the main discharge space, with materials having a low work function. One way of producing such a coating is by depositing on the electrode electrolytically, by vacuum evaporation, or by gas decomposition, a metal such as chromium, tungsten, or molybdenum, oxidizing the deposited metal, and depositing thereon an alkali metal such as caesium, preferably again oxidized. The last-named two processes will take place automatically in a discharge vessel which contains caesium; hence the processing previous to assembly of the generator can be terminated after the oxidation of the substrate when caesium is to be used as the gas filling.

Figure 2:
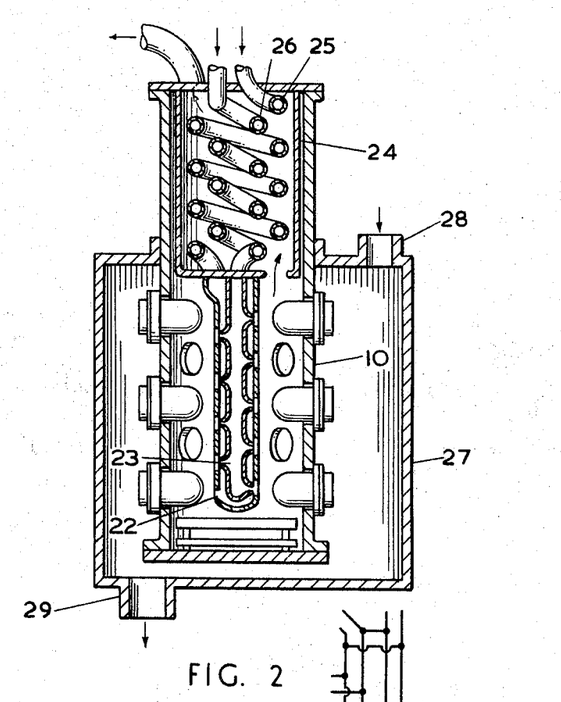
FIGS. 2 and 3 show, in cross-sections respectively along the axis and at right angles to the axis, a multiple generator comprising several thermionic generating units in a common combustion chamber provided with an economiser.
Figure 3:
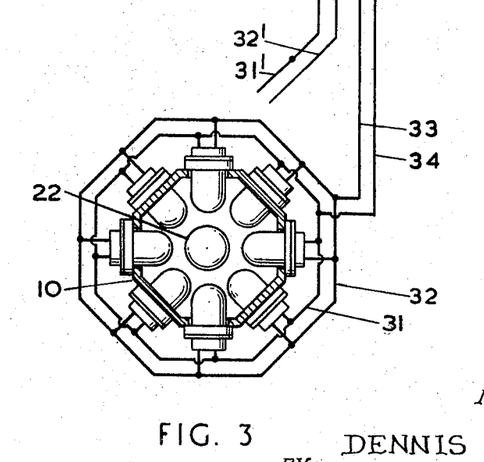
Figure 4:
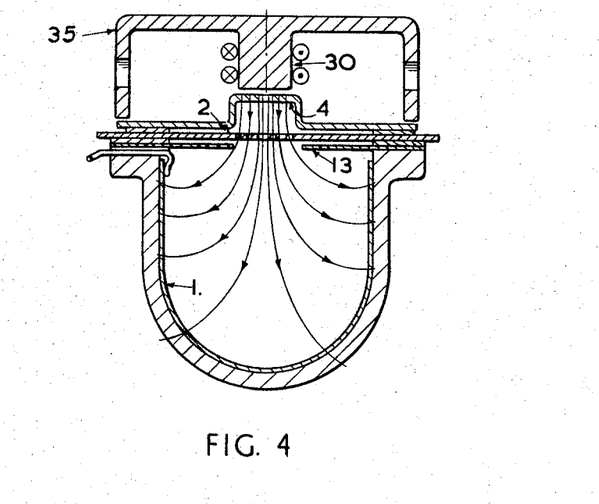
FIG. 4 shows in cross-sectional elevation a thermionic generator for generating direct current having an auxiliary magnetic field arranged to counteract the effect of the magnetic field of the discharge current itself, and to assist the emission of electrons by the cathode.
Figure 5:
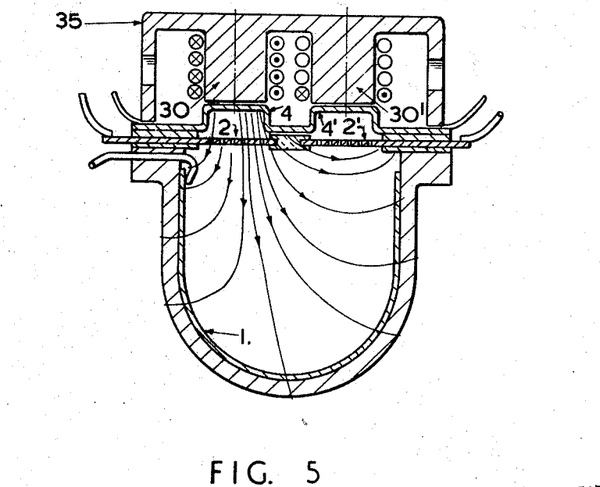
FIG. 5 shows a variant of FIG. 4 for generating alternating current.

FIGS. 2 and 3 are sections of a thermionic generator containing a plurality of generating units in which the cathodes are thimble-shaped with the normally-open ends closed by substantially flat anode and auxiliary electrode assemblies similar in construction to those shown in FIGS. 4 and 5. As shown in FIGS. 2 and 3, a combustion chamber having a ceramic envelope 10 of octagonal shape is fitted with a number of holes for taking the thimble-shaped units. The combustion chamber contains a burner for the fuel, which may be a gas, a vaporised liquid or a combustible dust. The fuel supply consists of a duct 22 for the fuel and a duct 23 for the oxidant, with nozzles, all preferably of refractory ceramic materials.

The combustion takes place at a constant temperature, e.g. 1600° C., the heat being conducted away by the thermionic devices at the rate at which it is produced. Thus the exhaust gases still have a temperature of 1600° C. This heat is utilised in an economiser 24, preferably inside the casing 10, which contains heat exchangers, for instance in the form of helical tubes 25, 26, for the preheating of the fuel and of the oxidant as nearly as possible to the temperature of the combustion chamber. The lower half of the envelope 10 is surrounded by a cooling chamber 27, 28, 29, FIG. 2, for cooling the anodes and auxiliary electrodes. The cathode and anode terminals of each annular group of units can be connected to a pair of common output leads 31 and 32, 31' and 32', etc. which pairs can be separately connected to a remote switchboard, or as shown, directly connected in parallel to output leads 33, 34 connected to the switchboard.

While in general the efficiency of prime-movers increases with their size, in large thermionic generators of the gas discharge type the difficulty arises that large discharge currents, produce a magnetic field which will limit the currents and increase the voltage drop. This is mainly due to the effect of the magnetic field near the cathode. A strong magnetic field component parallel to the cathode surface is generated and will tend to turn the electrons back into the cathode. This effect can be reduced by adding a magnetic field with a component at right angles to the cathode surface. The electrons then have a direction of easy escape, along the field lines.

FIG. 4 illustrates the application of a magnetic field with a component normal to the cathode surface in the case of a direct current generator comprising a thimble-shaped cathode 1, collector anode 2, and auxiliary anode 4. A magnet of the pot type is applied to the top of the device, consisting of a core 30 above the electrode 4, and a shroud 35 perforated to allow access to the coolant. The magnet can be energised by direct current, or can be a permanent magnet. It is seen that the magnetic flux, shown by arrowed lines, crosses the cathode surface approximately at right angles, thus creating the additional field required to let the electrons escape. Moreover, this field is strongest where it is most required, i.e. near the top of the cathode cavity where the electron current is strongest and therefore the self-field of this current is a maximum. This self-field runs in circles around the axis of symmetry of the device: hence, by itself it would be everywhere parallel to the cathode surface. The addition of the auxiliary magnetic field makes the resulting field run in helical lines, which all converge into the collector 2. It is seen that the magnetic flux gives a guidance to the electrons all the way. It has also a beneficial effect in preventing them from going to the radiation shield 13, which therefore will charge itself up to a positive voltage, until it will repel all or at least a major part of the ions. Thus the magnetic field is beneficial also from the point of view of ion economy.

FIG. 5 illustrates the use of a magnetic field normal to the emitter in the production of alternating current. This method consists in having in a thermionic generator at least two collecting electrodes cooperating with an emitter, the said collectors alternating between a lower and a higher voltage relative to the cathode, and the current flowing at any time to the collector with the lower potential, because the path to the other is barred by a magnetic field. In FIG. 5, there are two collectors 2 and 2', associated with two auxiliary anodes 4 and 4'. The division of the auxiliary anode into two, although useful, is not essential.

The magnetic system consists of a shroud 35 as before, but this one has two cores 30, 30' associated with the two collectors 2, 2'. The cores 30, 30' carry two systems of windings respectively energised with A.C. and D.C. so arranged that in each phase of the A.C., one core is fully energised and the other is fractionally energised in the same direction. The energisation during one phase is shown in FIG. 5 in which the complete set of left-hand windings and, for example, one quarter of the right-hand windings, are similarly energised. During the opposite phase, the current configurations in the two cores will be reversed. This can be achieved in well-known manner by energising three-eighths of each set of windings with A.C. but in reverse directions, and five-eighths of each set of windings with D.C. in the same direction, so that in one phase the currents add in one set of windings and subtract in the other, ⅝ − ⅜ = ¼, while in the other phase, the reverse happens. The smaller current in each case generates sufficient flux in the corresponding core to annul the stray flux which would otherwise enter from the fully-energised core.

Thus in both phases, the magnetic flux is similar to that generated in the system of FIG. 4, except that in each phase it is somewhat displaced from the axis of the casing. In one half-cycle, electrons from almost the whole cathode surface can be omitted, and can drift freely along the flux lines to the collector 2, while they are barred from collector 2' by the magnetic flux which crosses in front of said electrode. In the next half-cycle, the flux changes over from core 30 to core 30', and the electron current will flow to collector 2'.

The auxiliary magnetic fields as described in connection with FIGS. 4 and 5 are particularly suitable for large thermionic generator units, which otherwise could not be efficiently operated.

There are many alternative ways of putting units as described above into circuit. The power required for the operation of the auxiliary discharge, and for the magnetic controls, will usually be derived from the output of the generators, although it may be desirable to provide small accumulator sources of power. For example, the series-connected output of ten generators may provide the 15 volts required for the auxiliary discharge, either directly, or by charging an accumulator.

FIGS. 6–10 illustrates a thermionic generator which is particularly suitable for high current and power densities, and for large units. At high current densities of the order of 1 amp/cm.$^2$ or more, the foraminated collector area, even if supplemented by non-foraminous annular collector areas, is not sufficient for collecting the large currents at a negative drop between the plasma and the collector, and a positive voltage drop develops, which lowers the terminal voltage and the efficiency. Moreover, the plasma resistance, that is to say the resistance to the passage of electrons due to the high concentration of ions and electrons, becomes noticeable, even in gases like argon whose neutral atoms have a very small cross-section for slow electrons. It is therefore necessary in thermionic converters of high current density to reduce this resistance, by enlarging the collector area and reducing its distance from the emitter.

Figures 6, 7, 8:
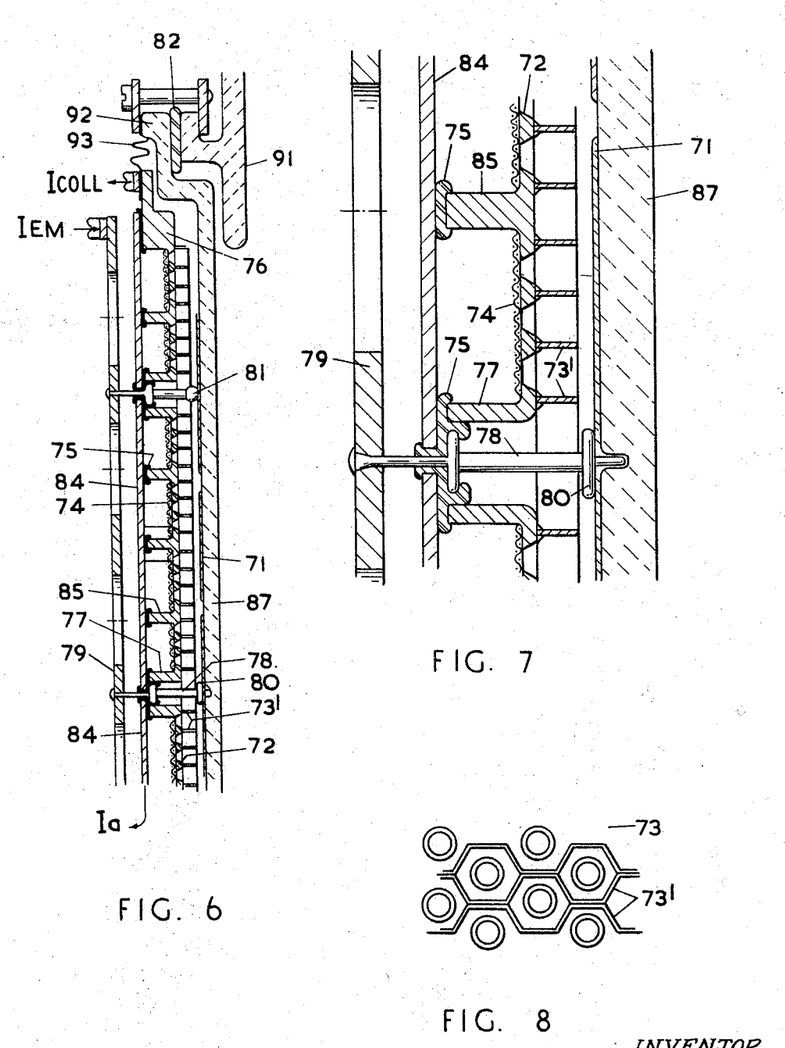
FIG. 6 shows, in section, the upper part of a thermionic generator particularly adapted for high power densities: it will be understood that the whole periphery of the generator is similar to, and is sealed in the same way as, the upper end.
FIG. 7 is an enlarged view of a part of FIG. 6.
FIG. 8 shows the cellular collector electrode of FIG. 7.
Figure 9:
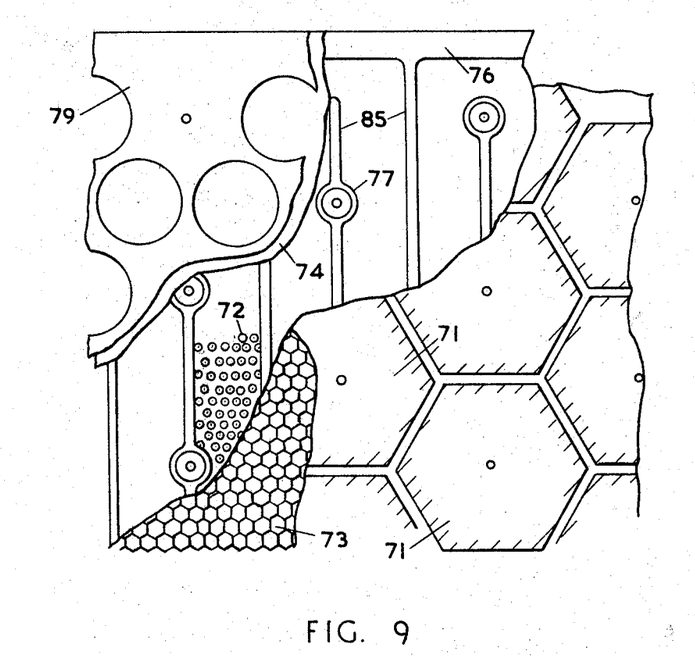
FIG. 9 is a partially-stripped plan view of the device shown in FIG. 7.

In FIG. 6, a ceramic plate 87 forms the hot side of the vacuum envelope. The plate 87 carries the emitter 71, in the form of metal plates or conducting coatings which are insulated from one another as indicated in FIG. 9.

The emitter is opposed at a short distance, for instance of the order of 1 mm., by the collecting electrode, which consists of a foraminated plate 72, together with a cellular or honeycomb structure 73, in good thermal contact therewith: see particularly FIGS. 7, 8. The holes in the plate 72, which are preferably conical, are closed by a fine-meshed gauze 74. The details are better seen in FIG. 7, which is an enlarged section, and in FIG. 8, which is a view, as seen from the emitter side of the honeycomb structure 73. The structure 73 is shown as consisting of highly-polished corrugated metal strips 73' at right angles to the plate 72 and with their adjacent edges brazed or welded to the foraminated plate 72, which itself is preferably made highly reflecting, for instance by electro-polishing. Adjacent strips 73' are so positioned relatively to one another as to form hexagonal cells.

In the design as shown, an area of the emitter 71 is opposed by a several times, for instance 3 to 6 times, larger collector area, including the surfaces of collector plate 72 and of the strips 73'. Comparatively little radiated heat is absorbed by the collector because the surfaces of the metal strips 73' are at right angles to the emitter, and they have high reflectivity, particularly for radiation incident at nearly glancing angles.

Figure 10:
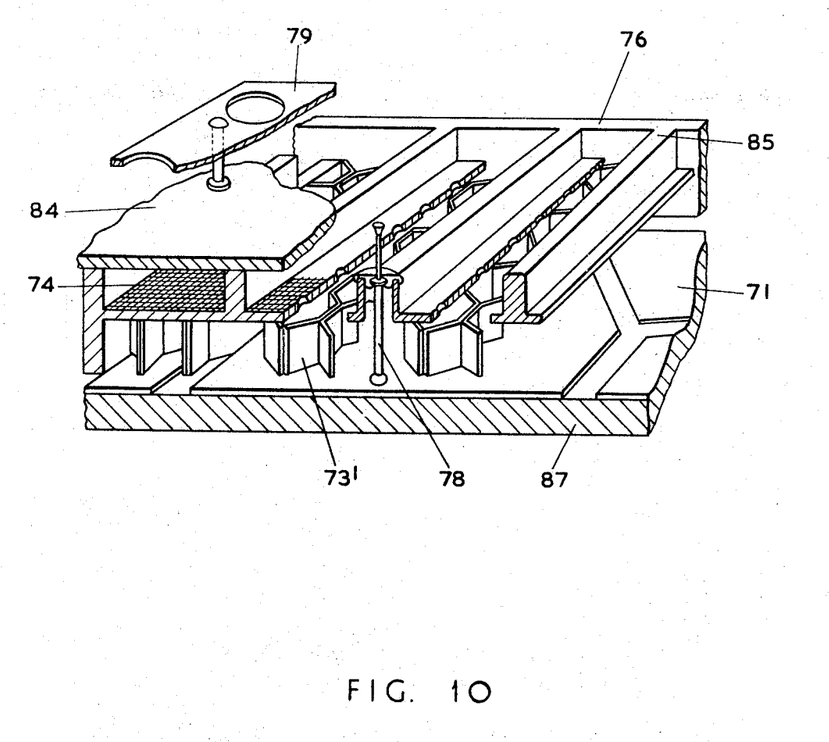
FIG. 10 is a partially-stripped perspective view of the device shown in FIGS. 6–9.

On its side remote from the emitter 71, the foraminated plate 72 carries a system of ribs 85, and at each edge it is fitted with a rim 76. The plate 72, the ribs 85, and the rim 76, enclose, with the auxiliary electrode 84, the auxiliary discharge space. As shown in FIGS. 9 and 10, the parallel ribs 85 extend alternately from opposite sides of the chamber normal to said sides and are shorter than the width of the chamber, so that successive pairs of passages between the ribs 85 are connected at alternately opposite ends to form a winding channel. The auxiliary electrode or anode 84 is a plane sheet of metal, cemented to the rim 76 and ribs 85 by thin insulating layers 75, preferably of a vitreous enamel. The layers 75 are thin enough to conduct the heat away without more than a small temperature drop to the coolant which is in contact with the outer side of the plate 84, i.e. the left-hand side as viewed on FIGS. 6 and 7.

In this design therefore, the auxiliary discharge space forms a continuous channel. This has the advantage that the auxiliary discharges, which form a great number of thin electron jets issuing from the forminations of plate 72, are more easily excited simultaneously than if they were shooting into separate discharge spaces. In the drawing, the forminations are shown to be in the centers of the cells. Though this is advantageous, precise registering of the cells and the holes might be difficult to achieve if the honeycomb structure is manufactured as a part in itself, and is not absolutely necessary. A good effect is achieved also if the holes and the cells are not in exact register, in which case, however, it is preferable to provide 2–3 holes per cell, so that at least one is at or near the central position.

The design as shown in the drawings can be realised by machining the plate 72 with its rim 76 and its ribs 85 out of one piece of metal; or by electro-forming it in one piece; or by forming it by pressing, by metal-ceramic methods. Alternatively, the plate 72 and its cellular structure 73 could be manufactured in one piece, and the ribs and the rim welded or brazed on later.

Each cell in the structure 73 is backed by one or more holes in plate 72 and by gauze 74 across the holes to form the foraminations, and forms an individual generator cell. An array of generator cells cooperates with each single emitter segment 71, and have common output leads. The emitter output leads in this design pass through the collector, in parallel, to a great number of separate emitter segments 71.

The plate 72 carries at intervals tubular members 77 through which pass cathode rods or leads 78, each connected to a respective cathode segment 71. The rods 78 pass through insulating washers 75 in the collector and carry heads which support the collector in spaced relation to the emitter and prevent collapse of the collector due to the pressure differences on its opposite sides. Thus the rods 78 act both as electrical leads and as constructional supports. The rods 78 are preferably formed of a metal of high melting point, such as tungsten or molybdenum, and are connected at their outer ends with a plate 79, which acts as a common terminal and is formed with holes to allow circulation of coolant via the back of the casing and the auxiliary electrode 84. As the rods 78 conduct not only the emitter current but also the heat flux from the upper to the lower temperature, their cross-section must be so dimensioned that the voltage drop therein is the optimum of 0.05 to 0.1 volt. At the hot end, the rods 78 may be fitted with a washer 80 provided with a central stud engaging a depression in the plate 87 so that the washer is in fixed planar contact with the cathode surface. Alternatively, the rods 78 are formed with rounded ends 81, FIGS. 6, which make sliding contact with the emitter: such ends can be formed by melting tungsten or molybdenum wires in an electric arc. An example of each type of contact 80, 81, is shown in FIG. 6. The termination 80 allows the use of very thin emitter coatings 71, but requires accurate registering: with the rounded ends 81, thicker emitter coatings must be used, to prevent them being rubbed through by the sliding contact during the thermal expansion and contraction at the beginning and end of the operation of the generator. The relative expansion between the cold metal collector and the hot ceramic envelope may be as much as 1–2%; leads 78 are designed accordingly.

It has already been stated that the spacing between the emitter surface and the front edges of the collector cells for manufacturing purposes is of the order of 1 mm. With such spacing, the distance between and normal to an opposed pair of sides of an individual cell of the structure 73 would be 4 mm., and the depth of the cell would also be 4 mm., while the gauze 74 would have 30 wires per cm.

The design shown in FIGS. 6–10 solves two problems in one. The first is the suppression of the self-magnetic fields, the other is the accurate relative positioning of collector and emitter. It is possible to make the ceramic envelope relatively thin, because the forces due to atmospheric pressure will be taken up at a great number of evenly distributed points by the emitter leads 78, which accurately determine the small gap between the parts 84 and 71. Self-magnetic fields, that is to say, the magnetic fields parallel to the emitter, which greatly hamper the emission electrons, can be reduced to any desired extent by sufficient subdivision. As an example, assume a unit of about 1 kilowatt, with a total emitter current of 1000 amps. If the emitter is divided into 100 segments 71, each lead 78 carries only 10 amps. The magnetic field strength $H_{crit}$ which appreciably disturbs the emission is of the order of 10 oersteds. This will exist within a circle of a radius of only 0.2 cm. around the conductor: hence the disturbance will not extend much further than the cooling effect of the cathode lead. With 100 amps. in the lead, this critical radius would be 2 cm. The design in effect subdivides large converters of any size into small ones with good efficiency.

FIG. 6 shows a suitable design for the edges of large units. The ceramic envelope 87 has a Z-shaped rim 92, protected from the heating medium by the projecting ledge 91 of the mounting frame, preferably also of ceramic material, on which it is mounted with a soft gasket 82 of asbestos or the like. A thin elastic metal bellows 93 is brazed between the rim of the ceramic envelope and the collector rim 76. The bellows 93 is continuous around the whole periphery of the generator and forms a vacuum seal for the generator chamber. In this design the brazed areas are kept cool by intimate contact with the coolant. The large collector current and the equally large emitter current are preferably taken off at several points of the periphery, by positive and negative leads at each point, so that the equally large and opposite currents locally compensate one another, and do not create appreciable magnetic fields in the discharge space.

The whole design can be understood from FIG. 9 which is a partly stripped view, on the same scale as FIG. 6. In the top left-hand corner is seen the perforated plate 79 through which can be seen the anode plate 84. In the adjacent area both are stripped off and the auxiliary discharge space is seen to pass around the ribs 85: the gauze is not shown and the foraminations are indicated in a part of the area only. Next to this area is shown the cellular or honeycomb structure 73 with the collector 72 stripped off. In the bottom right-hand part the aspect of the emitter is shown, with the whole collector stripped away.

The emitter consists of, for instance, hexagonal islands 71 of conducting and emitting material, such as thoriated tungsten or thoria or the like, having a thickness within the range from a few microns to about one thousandths of an inch and applied as a refractory metallic coating on ceramic plate 87, which coating can be produced for instance by sputtering, or by chemical deposition from liquids or gases. As refractory metals are expensive, applying them in thin layers represents a large saving in cost. This design facilitates reconditioning converters in which cathode emission has failed. The other components have almost unlimited life and can be used again.

As an example, a unit of one foot square of this design can supply about 1 kilowatt at an emitter current density of 1 amp./cm.$^2$ and 4 kilowatts at 4 amp./cm.$^2$. Any number of such units can be combined in large generators such as may be used for instance in electrical vehicles or power stations.

Figure 11:
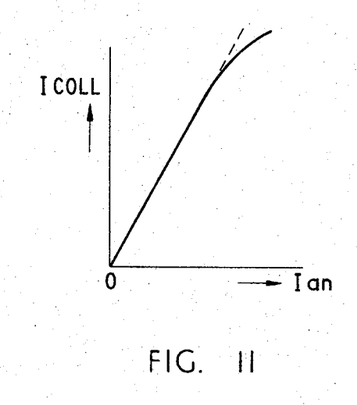
FIG. 11 shows the relation between collector currents and currents in the auxiliary discharge.
Figure 12:
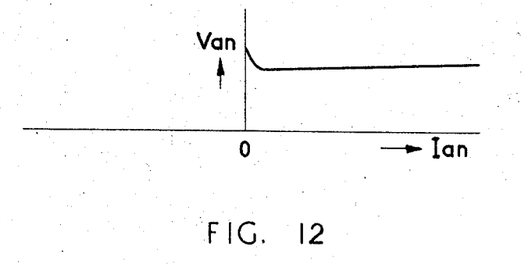

FIG. 11 shows the relation between the collector current and the auxiliary anode current. This characteristic is almost linear until cathode saturation sets in when the ratio of collector current to anode current may be as large as 10:1 or even 100:1. This affords easy regulation of thermionic electric generators employing an auxiliary discharge. FIG. 12 shows the characteristic of the auxiliary discharge. No current flows at negative anode voltage. In the operational region of the discharge the voltage drop rises slightly with the current, that is to say, the characteristic is slightly positive.

Figure 13:
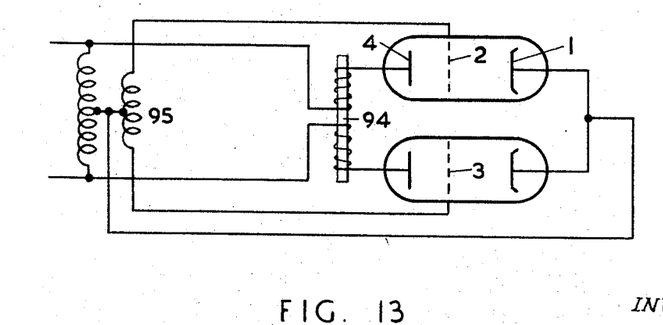
FIG. 13 is a circuit diagram of a device for operating two or more generating units to give alternating current.

FIG. 13 is a circuit for the operation of two or more thermionic electric generators as described above for the direct production of alternating current of technical frequencies. This method of generation of alternating current is based on the fact that in the generators described above the main discharge between emitter and collector can be controlled by a relatively small power in the auxiliary discharge between the collector and the auxiliary anode, as will be seen from the characteristics shown in FIGS. 11 and 12. In this method two groups of generators, each containing at least one thermionic generator of the same type as used for D.C. generation, are used in a push-pull arrangement: that is to say, they supply current pulses of opposite sign from collectors 2, 3 alternatingly into a common A.C. lead via coil 95. These pulses are controlled by supporting the auxiliary anode current alternatingly in one and in the other of the two groups. Preferably, the two sets of auxiliary currents are led through windings of a common magnetic circuit 94 in such a sense that the magnetisation does not change when one group takes over from the other, with the same intensity. This common choke 94 provides a high striking voltage peak at the start of the operation. The frequency of operation can be controlled by the common A.C. mains into which the thermionic converters deliver power, or, in the case of an automation generator, by an oscillator or the like, as is well known in the art.

What I claim is:

1. In a thermionic generator of electricity, a main discharge chamber, an auxiliary discharge chamber, a collector electrode which separates said main discharge chamber from said auxiliary discharge chamber and which is at least partly foraminated, an electron emitter electrode opposed to one side of said collector electrode in said main discharge chamber, an auxiliary electrode opposed to the other side of said collector electrode in said auxiliary discharge chamber, a gas atmosphere having a pressure of a single-figure number of millimeters of mercury in both said chambers which communicate solely via said at least partly foraminated collector electrode, heating means for said emitter electrode, cooling means for said auxiliary and collector electrodes, and electrical connection terminals for each of said electrodes.

2. In thermionic generator equipment for generating electricity, a plurality of generator units according to claim 1, a common casing for said units, common heating means for the emitter electrodes of said units, common cooling means for the auxiliary and collector electrodes of said units, and electrical connection terminals for groups of emitters and collectors respectively.

3. A thermionic generator according to claim 1, wherein said electrical connection terminals are exterior to said main and auxiliary discharge chambers, and wherein said emitter electrode has a continuous surface carrying emitter material and said collector electrode has a continuous surface in closely spaced parallel relation to said emitter surface, said emitter material comprising a plurality of discrete coplanar emitter plates on said emitter surface each having its own output lead which passes independently through said collector electrode for connection to the emitter electrical connection terminal, so as to prevent a concentration of self-magnetic fields in any section of the generator.

4. A thermionic generator according to claim 1 wherein the collector and emitter electrodes comprise closely-spaced generally-parallel structures, and the collector electrode structure comprises a base at least part of the area of which is foraminated, and projections which are electrically connected to said base and extend towards the emitter electrode structure, each projection having at least one surface available for electron collection.

5. A thermionic generator according to claim 1, including magnetic field generating means for generating magnetic fields having a component normal to the emitter surface of the emitter electrode adequate for ensuring electron emission from the emitter electrode to the collector electrode.

6. A thermionic generator according to claim 1 wherein the collector and emitter electrodes comprise substantially parallel generator structures, and including an array of supports normal to and extending between said substantially parallel generator structures arranged to space and support said structures against outside atmospheric pressure, said supports comprising electrical conductors from the emitter structure passing through the main discharge chamber and the collector structure to a plate terminal for the emitter.

7. A thermionic generator according to claim 1 wherein the emitter comprises a plurality of discrete emitter surfaces each having its own output lead passing via the discharge chambers to a common emitter terminal.

8. Electrical equipment for converting direct current into alternating current which comprises two sets of thermionic three-electrode electron discharge generators according to claim 1 operable in push-pull, each set comprising at least one generator, and which comprises a common magnetic circuit for the auxiliary currents of the two sets of generators operating in push-pull so that the sum of the auxiliary currents is substantially constant in time.

9. An electron discharge thermionic generator according claim 1 including two discrete collector electrodes, a magnetic control system for the electron discharge path to each collector electrode, means for applying an accelerating voltage between each collector electrode and the auxliary electrode, and switching means for creating magnetic conditions favorable to electron discharge in one discharge path in which the collector electrode voltage relative to the emitter electrode is momentarily lower and magnetic conditions unfavorable to electron discharge in the other discharge path in which the collector electrode voltage relative to the emitter electrode is momentarily higher, and for striking the auxiliary discharge only in the auxiliary discharge space behind the collector electrode whose discharge path has momentarily the favorable magnetic conditions, so that the electron current from the common emitter electrode flows to said collector electrode whereby alternating current and power are generated.

10. In a thermionic generator, a plurality of parallel closely-spaced emitter and collector structures constituting a coplanar array of electron discharge chambers wherein the emitter structure comprises a plurality of discrete emitter surfaces each forming the emitter surface for at least one discrete discharge chamber, a gas filling in said discharge chambers having a pressure of a single-figure number of millimeters of mercury, means for heating the emitter structure, means for cooling the collector structure, a common emitter terminal on the opposite side of said collector structure from said emitter structure, and a plurality of electrically conductive supports between and at right angles to said structures to withstand atmospheric pressures, said supports passing through and being insulated from the collector structure and being connected to said common emitter terminal, there being at least one support for each discrete emitter surface, which support also acts as an electrical connection from the corresponding discrete emitter surface to said common emitter terminal.

11. A thermionic generator according to claim 4 wherein the collector electrode structure comprises a flat base and an array of corrugated strips normal to the base and forming therewith a cellular structure.

12. A generator according to claim 11 including a metal collector baseplate having cylindrical surfaces connecting front and rear within each cell, said surfaces tapering towards the rear, and wire mesh covering the rear portions of said cylindrical surfaces.

13. A thermionic generator according to claim 11 wherein the collector base is wholly formed of wire mesh.

14. A thermionic generator according to claim 1 wherein the gas atmosphere consists of heavy inert gas containing caesium at a pressure of the order of a micrometer of mercury, and which includes a monomolecular layer of caesium on the collector surface.

15. A thermionic generator according to claim 4 wherein the emitter electrode structure comprises a ceramic plate having an emissive coating of conductive material having a thickness within the range from a single-figure number of microns to about one thousandth of an inch.

16. A thermionic generator according to claim 4 including electrically insulating and heat conducting layers between adjacent portions of said collector electrode structure and of the auxiliary electrode.

References Cited by the Examiner
UNITED STATES PATENTS

| | | | |
|---|---|---|---|
| 1,593,373 | 6/1926 | Bijl | 310—4 X |
| 2,735,977 | 2/1956 | Webster | 321—36 |
| 2,741,734 | 4/1956 | Johnson | 321—36 |
| 2,915,652 | 12/1959 | Hatsopoulos | 310—4 |
| 2,980,819 | 4/1961 | Feaster | 310—4 |
| 3,021,472 | 2/1962 | Hernqvist | 310—4 X |
| 3,054,914 | 9/1962 | Hatsopoulos | 310—4 |
| 3,138,725 | 6/1964 | Houston | 310—4 |

OTHER REFERENCES

Gabor, D., A New Thermionic Generator. Nature, March 18, 1961, vol. 189 (pages 868 to 872).

MILTON O. HIRSHFIELD, *Primary Examiner.*

O. L. RADER, *Examiner.*

J. W. GIBBS, *Assistant Examiner.*

UNITED STATES PATENT OFFICE
CERTIFICATE OF CORRECTION

Patent No. 3,312,840 April 4, 1967

Dennis Gabor

It is hereby certified that error appears in the above numbered patent requiring correction and that the said Letters Patent should read as corrected below.

Column 2, line 61, after "characteristic" insert -- and --; column 4, line 39, after "having" insert -- 32 wires/cm or --; column 5, after "currents" strike out the comma; column 7, line 19, for "on" read -- in --; lines 23 and 26, for "forminations", each occurrence, read -- foraminations --; column 9, line 39, for "supporting" read -- suppressing --; line 49, for "automation" read -- autonomous --; column 10, lines 49 and 50, after "according" insert -- to --; line 54, for "auxliary" read -- auxiliary --; column 11, line 17, after "A" insert -- thermionic --.

Signed and sealed this 14th day of November 1967.

(SEAL)
Attest:

EDWARD M. FLETCHER, JR.
Attesting Officer

EDWARD J. BRENNER
Commissioner of Patents